(12) United States Patent
Waldor

(10) Patent No.: US 9,091,367 B2
(45) Date of Patent: Jul. 28, 2015

(54) BACKFLOW CAPABLE BALL CHECK VALVE

(71) Applicant: Matthew L.T. Waldor, Bloomington, MN (US)

(72) Inventor: Matthew L.T. Waldor, Bloomington, MN (US)

(73) Assignee: Water Technology Resources, Bloomington, MN (US)

( * ) Notice: Subject to any disclaimer, the term of this patent is extended or adjusted under 35 U.S.C. 154(b) by 90 days.

(21) Appl. No.: 13/798,650

(22) Filed: Mar. 13, 2013

(65) Prior Publication Data

US 2014/0116540 A1    May 1, 2014

Related U.S. Application Data

(60) Provisional application No. 61/720,858, filed on Oct. 31, 2012.

(51) Int. Cl.
| F16K 15/00 | (2006.01) |
| F16K 17/00 | (2006.01) |
| F16K 21/04 | (2006.01) |
| F16K 31/44 | (2006.01) |
| F16K 15/04 | (2006.01) |
| F16K 15/18 | (2006.01) |

(52) U.S. Cl.
CPC ............. F16K 31/44 (2013.01); F16K 15/04 (2013.01); F16K 15/183 (2013.01)

(58) Field of Classification Search
CPC .................................. F16K 31/44; F16K 15/04
USPC ............ 137/522, 533.11; 251/82, 84, 87, 279
See application file for complete search history.

(56) References Cited

U.S. PATENT DOCUMENTS

| 865,151 | A | * | 9/1907 | Andrew .................. 417/446 |
| 1,099,032 | A | | 6/1914 | Fraser |
| 1,839,730 | A | * | 1/1932 | Baten et al. ............... 137/466 |

(Continued)

FOREIGN PATENT DOCUMENTS

| EP | 0164189 A1 | 12/1985 |
| WO | WO-2014/070990 A1 | 5/2014 |

OTHER PUBLICATIONS

"International Application Serial No. PCT/US2013/067710, International Search Report mailed Mar. 28, 2014", 2 pgs.

(Continued)

*Primary Examiner* — John K Fristoe, Jr.
*Assistant Examiner* — Kelsey Rohman
(74) *Attorney, Agent, or Firm* — Schwegman Lundberg & Woessner, P.A.

(57) ABSTRACT

A backflow capable ball check valve includes a valve body including a fluid flow passage and a ball seat within the fluid flow passage. A valve ball is within the fluid flow passage and is configured for seating on the ball seat. The valve ball is movable between a normal operation and backflow capable modes. A stem and saddle assembly is coupled with the valve body, and the stem and saddle assembly is configured to cup the valve ball. Movement of the stem and saddle assembly moves the valve ball from the normal operation mode to a backflow capable mode. In the backflow capable mode the stem and saddle assembly positions the valve ball away from the ball seat with the saddle cupping the valve ball in surface to surface contact, for instance according to pivoting at a movable joint.

20 Claims, 6 Drawing Sheets

(56) References Cited

U.S. PATENT DOCUMENTS

| | | | |
|---|---|---|---|
| 1,989,870 A | | 2/1935 | Lafferty, Jr. |
| 3,539,150 A | | 11/1970 | Conrad |
| 4,273,310 A | | 6/1981 | Ginzler |
| 6,149,125 A | * | 11/2000 | Nilsson ............................ 251/82 |
| 7,178,554 B2 | * | 2/2007 | Tanner et al. .................. 137/828 |
| 8,191,570 B2 | * | 6/2012 | Purkis ........................ 137/493.9 |

OTHER PUBLICATIONS

"International Application Serial No. PCT/US2013/067710, Written Opinion mailed Mar. 28, 2014", 6 pgs.

"International Application Serial No. PCT/US2013/067710, International Preliminary Report on Patentability mailed May 14, 2015", 8 pgs.

\* cited by examiner

BACKFLOW CAPABLE BALL CHECK VALVE

CLAIM OF PRIORITY

This application claims the benefit of priority under 35 U.S.C. §119(e) of Waldor, U.S. Provisional Patent Application Ser. No. 61/720,858, entitled "BACKFLOW CAPABLE BALL CHECK VALVE", filed Oct. 31, 2012, which is herein incorporated by reference in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright Water Technology Resources, Bloomington, Minn., USA.

TECHNICAL FIELD

This document pertains generally, but not by way of limitation, to valves and check valves.

BACKGROUND

Check valves are used in piping systems to allow unidirectional flow of fluids. Reverse or backflow of fluids (back flushing) is prevented by the check valve during normal operation. There are various types of check valve designs including 90 degree swing check valves and 45 degree flexible disc check valves. These valves include discs, shafts, stems, and seals located in some examples in the fluid path of the valve. These valves are used in some examples with fluids, such as wastewater, including viscous sludge, stringy material, wet strength paper products, and other debris that tend to foul the interior components of the valves thereby affecting their performance and requiring the valves to be taken out of the line of service. Swing check valves and flexible check valves are less suitable for applications involving fluids with solids and semi-solids therein (e.g., sludges, fluids with entrained solids such as fibrous or stringy material, brush and the like). The materials within the fluid accumulate and foul the discs and shafts of the valves and accordingly frustrate operation of the discs to fully open and also fully close the valves and prevent backflow. For example, the discs and shafts are prone to accumulate stringy material. As the valve mechanisms become fouled the valves require service and maintenance to remove the fouling materials, which involves the valves to be opened to provide access to internal parts. Such service and maintenance requires the valves be taken out of service and contaminated, offensive wastewater and sludge, located upstream of the valves in the pipeline must be drained and disposed of.

Another type of check valve, ball check valves, addresses these issues by providing a valve ball within the valve body. In a zero flow (backflow shutoff) configuration the valve ball returns to its seated position within a seat in the valve body to substantially prevent the backflow of fluid. During normal operation, the flow of fluid pushes the valve ball (e.g., a valve ball of about 2 inch diameter weighing about 0.5 pounds up to a valve ball of about 24 inch diameter weighing over 400 pounds) out of the seat and the fluid flows around the ball. Alternatively, the valve ball is pushed into a recessed area (e.g., a side track area) of the valve body that substantially opens the passage of the valve entirely to facilitate full flow without interference by the valve ball. Because the valve ball is freely movable within the valve body and has a spherical shape, the solids and semi-solids present in sludges, such as sewage and storm water, easily pass through the valve and are not trapped on mechanical components like the discs and shafts present in swing check valves and flexible disc check valves.

The mechanical components of some example swing check valves and flexible disc check valves do include a mechanical linkage that allows for movement of the discs from a seated shutoff position to a backflow position when backflow through the valves is desired. For instance, when backflushing of a pump or draining of a pipeline is needed, the discs of these valves are moved out of engagement with a disc seat to allow for reverse flow of fluids through the valves. Because ball check valves are freely movable within a valve body, the ball check valve is unsuitable for backflow operation.

One example of a ball check valve that allows for backflow is found in U.S. Pat. No. 187,373. The ball check valve in this example includes a valve seat at a 45 degree angle with respect to the main fluid passage (e.g., the seat extends into the fluid passage) that holds the valve ball therein and provides a discontinuity and obstruction to the main fluid passage. The valve includes a rod that engages with the valve ball to bias the valve ball upwardly along the valve seat (e.g., at the 45 degree angle) and accordingly allow at least partial backflow when desired.

Overview

The present inventor has recognized, among other things, that a problem to be solved can include providing reliable backflow (including backflush) capability and pipeline drainage to a ball check valve without damaging the valve ball of the ball check valve. In an example, the present subject matter can provide a solution to this problem, such as by including a stem and saddle assembly configured to engage and support the valve ball during movement from a normal operation mode, wherein the valve ball is configured to seat against a ball seat and prevent backflow, to a backflow capable mode wherein the valve ball is biased away from the ball seat. In one example, at least the saddle is pivotable to support the valve ball throughout movement. The stem and saddle engage in surface to surface contact with the valve ball during at least a portion of the movement into the backflow capable mode. The hemispherical shape of the saddle provides the surface and support for engagement with the valve ball and substantially prevents damage to a pliable (e.g., resilient) coating of the valve ball, such as butyl rubber. Stated another way, the saddle substantially minimizes point contact with the pliable ball coating and instead provides a supportive cup to move the valve ball into the backflow capable mode. In the example, where the saddle is pivotable relative to the stem, for instance with a movable joint, as the valve ball is gradually moved into the backflow capable mode the saddle supports the valve ball in surface to surface contact throughout the movement. The saddle accordingly self-adjusts automatically to the valve ball position through pivoting at the movable joint without damaging the pliable coating of the ball. Accordingly, the ball check valve is backflow capable in a reliable manner that does not damage the valve ball and accordingly does not impair future operation of the valve to prevent backflow in the normal operation mode.

Additionally, the stem and saddle assembly moves the valve ball out of the path of a continuously linear fluid flow passage through the valve body to provide a continuous and linear pathway through the valve body for backflow and backflushing of a pump and for drainage of a length of upstream fluid in a pipe. Further, the stem and saddle assembly, during normal operation, is substantially recessed outside of the fluid flow passage to thereby ensure an open fluid flow passage with a corresponding minimal head friction pressure loss (e.g., pressure drop) and to prevent solids accumulation on the stem and saddle assembly.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
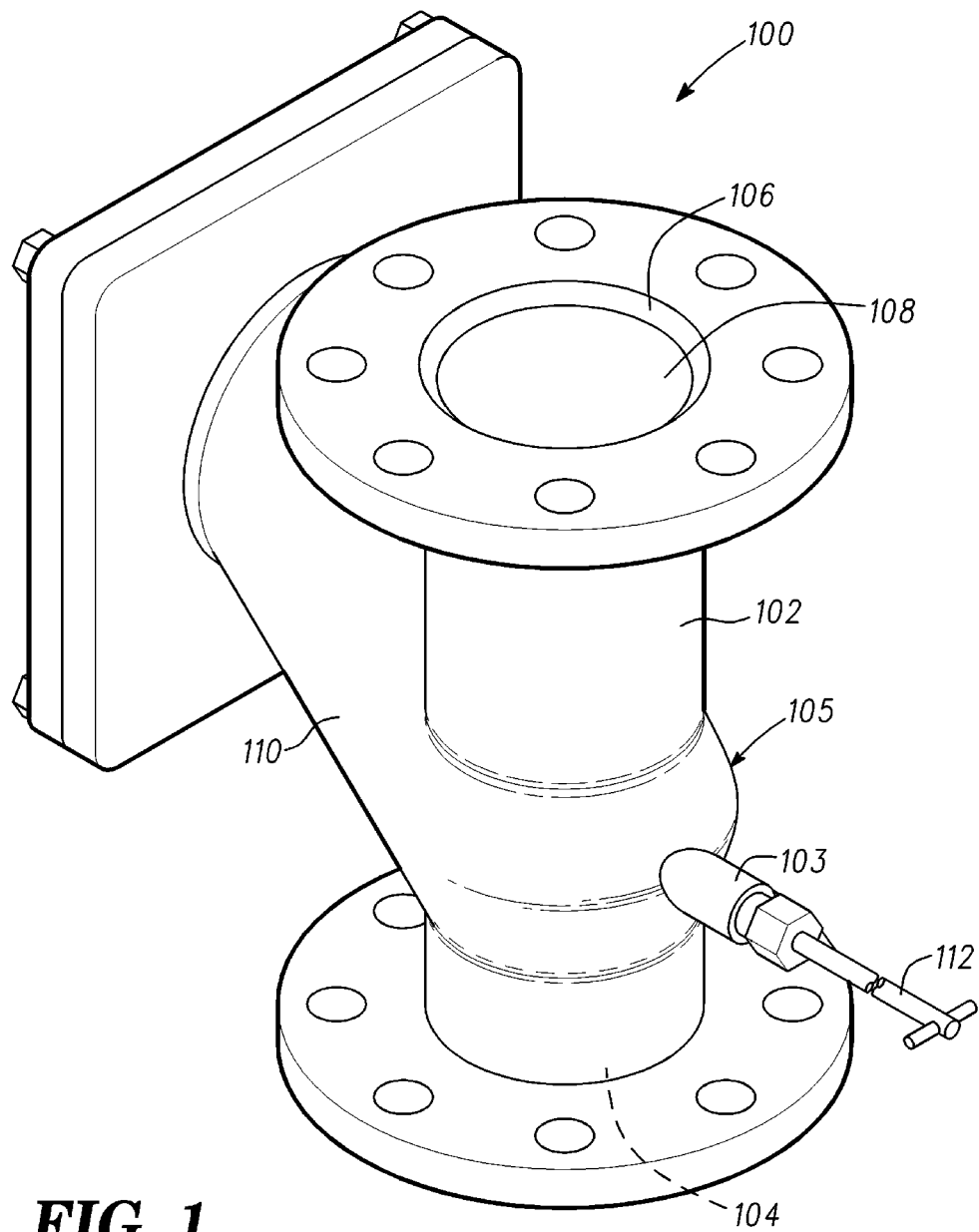
FIG. 1 is a perspective view of one example of a backflow capable ball check valve.

FIG. 1 shows one example of a backflow and backflush capable ball check valve 100, herein referred to as backflow capable ball check valve. The valve 100 includes a valve body 102 constructed with, but not limited to, carbon steel, stainless steel, ductile iron, other metal alloys, plastics or the like. The backflow capable ball check valve 100 includes a valve inlet 104 and a valve outlet 106. In one example, the valve inlet and valve outlet 104, 106 are of the same size and therefore have a consistent full flow area throughout the valve. As shown in FIG. 1, a continuous linear fluid flow passage 108 extends through the valve body 102. As will be described herein, the backflow capable ball check valve 100 provides for unidirectional flow of fluids through the continuous linear fluid flow passage 108 without providing discontinuities or restrictions to the fluid flow, for instance with the inclusion of an inline (e.g., in the path of fluid flow) angled divert to receive a valve ball therein. Additionally, the backflow capable ball check valve 100 provides a backflow capable mode that positions a valve ball away from a ball seat without damaging the valve ball or its resilient (e.g., pliable or resilient) coating. In the backflow capable mode, fluid flow in a direction opposed to the normal operation mode or operational mode is available for backflushing of pumps to unclog pump impellers fouled with solids, stringy fibrous materials and the like, or to drain fluid from an upstream location installed in line with the backflow capable ball check valve 100. The backflow capable ball check valve 100 described herein uses a stem and saddle assembly 112 having a cup shaped saddle to provide surface to surface contact between the assembly 112 and the ball (including its pliable coating) during movement from the seated position where the valve ball is received in a ball seat to a backflow capable position shown herein. Point engagement between the valve ball and the stem of the assembly 112 is thereby avoided (e.g., with a pivotally mounted saddle) and the resilient coating of the valve ball is preserved over the lifetime of operation for the backflow capable ball check valve 100. The stem and saddle assembly 112 is partially housed in a stem and saddle body 103 connected to a bellow 105. The bellow 105 is integrally formed with the valve body 102 such that the bellow 105 defines a saddle recess described herein.

As further shown in FIG. 1, a sidetrack 110 (e.g., a sidetrack or recess configured to receive a valve ball during normal operation and backflow capable positioning) is provided in the valve body 102. The sidetrack 110 is sized and shaped to receive a ball, for instance, a valve ball of the backflow capable ball check valve 100 therein during a normal operation mode of the ball check valve. In the example shown in FIG. 1, the backflow capable ball check valve 100 further includes a stem and saddle assembly 112 that during normal operation is recessed into a bellow shaped configuration (e.g., saddle recess 212) integrally cast into the valve body 102, as described herein. As will be described in further detail below, the stem and saddle assembly 112 is operated to move the valve ball at least partially into the sidetrack 110 to thereby allow for backflow or back flushing of fluids from the valve outlet 106 to the valve inlet 104 and continuing on through a flow developer, including, in one example, a pump.

Figure 2A:
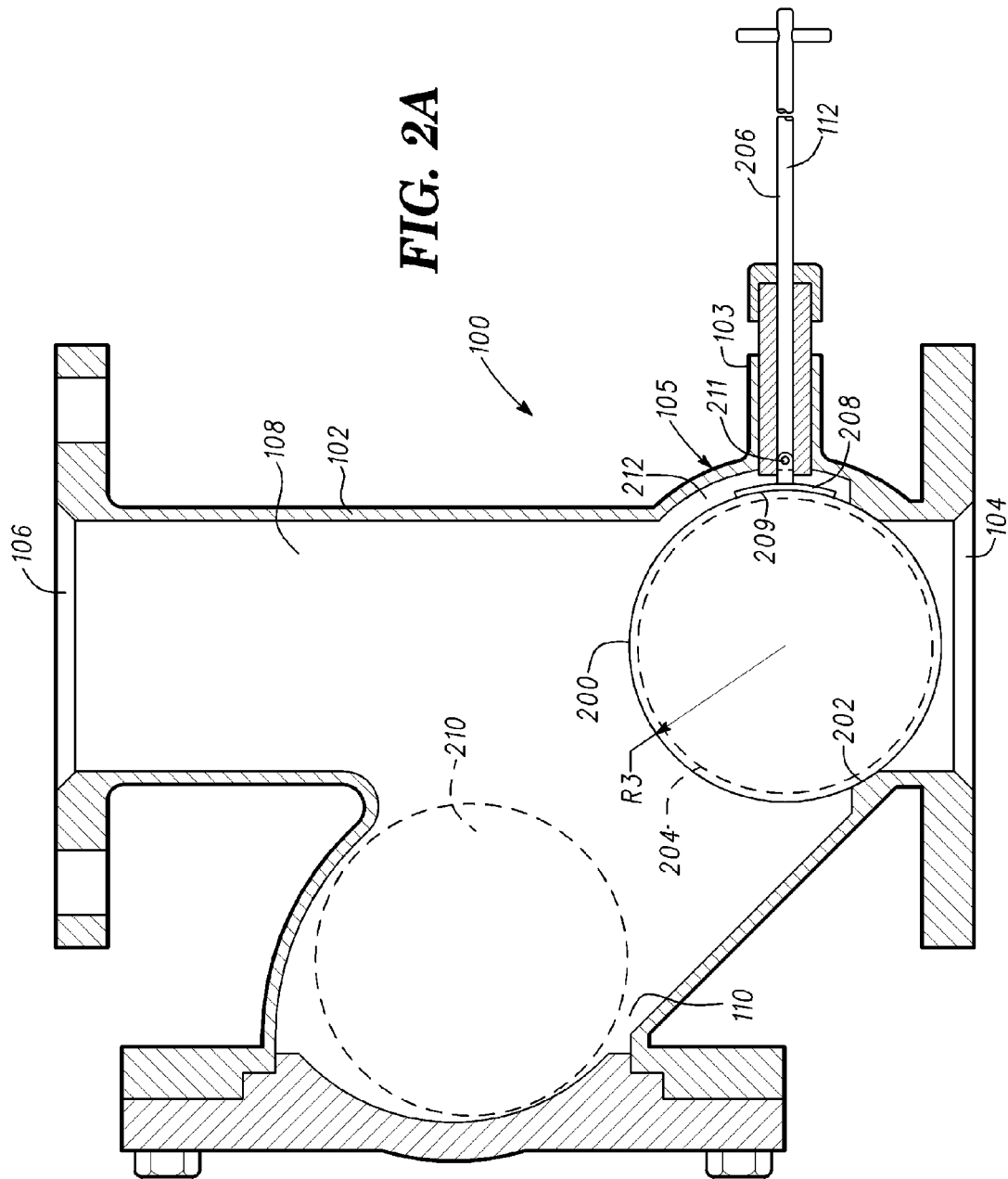
FIG. 2A is a cross sectional view of the ball check valve of FIG. 1 with a valve ball in a normal operation mode.

FIG. 2A shows a cross sectional view of the backflow capable ball check valve 100 previously shown in FIG. 1. As shown, the fluid flow passage 108 extends through the valve body 102 between the valve inlet 104 and the valve outlet 106. The valve ball 200 is shown in FIG. 2A in the normal operation mode. As shown the valve ball 200 is seated within a ball seat 202, for instance, adjacent to the valve inlet 104. In an example, the ball seat 202 is adjacent the fluid flow passage 108, such that the ball seat 202 is coincident with an outside of a perimeter of the fluid flow passage 108. That is, the ball seat 202 is adjacent to the conduit or fluid flow passage 108 such that the ball seat does not interfere with a flow path of the fluid. The stem and saddle assembly 112 is shown in a withdrawn position to thereby allow free movement of the valve ball 200 relative to the remainder of the valve body 102. In one example, the valve ball 200 includes an aluminum, ductile iron or steel ball having a pliable (e.g., resilient) coating 204, including, but not limited to, nitrile rubber, ethylene propylene diene monomer (EPDM) rubber, polyurethane, butyl rubber or the like, therearound. The pliable coating 204 (e.g., resilient coating) allows for fluid tight sealing of the valve ball 200 with the ball seat 202 and thereby correspondingly forms a tight seal to prevent backflow of a fluid pumped through the backflow capable ball check valve 100 during the normal operation mode. As further shown in FIG. 2A in phantom lines, the valve ball 200 is shown fully positioned within the sidetrack 110 (e.g., in a full flow ball position 210). For instance, during a normal operation mode, the hydrodynamic force and pressure applied by the fluid moving through the fluid flow passage 108 moves the valve ball 200 into the sidetrack 110 and thereby provides a substantially linear and continuous fluid flow passage 108 through the valve body 102 without restriction, as compared to designs with restrictions such as angled seats and recesses. As shown, for instance, in FIG. 2A the valve ball 200 is shown in a full flow ball position 210. The linear and continuous fluid flow passage 108 with the valve ball 200 positioned outside of the passage 108 allows for continuous flow of fluids without discontinuities provided by, for instance, angled diverts used to direct a valve ball into a recess.

Referring again to FIG. 2A, the stem and saddle assembly 112 previously shown in FIG. 1 is shown in cross section. The stem and saddle assembly 112 includes a stem 206 coupled with a saddle 208 by way of a movable joint 211. The stem and saddle assembly 112 is shown partially housed in the stem and saddle assembly shell 103. The movable joint, in one example, includes, but is not limited to, a pivot joint, a flexible coupling, a living hinge, a universal joint with multiple degrees of freedom and the like. As shown in FIG. 2A, the saddle 208, in one example, includes a saddle inner surface 209. In one example, the saddle inner surface 209 has a corresponding shape to provide surface to surface contact and support to the perimeter of the valve ball 200. For instance, as shown, the valve ball 200 has a predetermined radius R3 to provide the spherical shape of the valve ball. The saddle inner surface 209, in one example, has a corresponding radius R1, R2 to thereby provide a surface to surface contact or cupping of the valve ball 200, for instance, during operation of the stem and saddle assembly 112 to move the valve ball 200 out of reception (e.g., out of a seated position) with the ball seat 202. The above described movable joint 211 allows the saddle 208 to pivot and maintain surface to surface contact with the valve ball 200 throughout movement of the ball into the backflush capable mode (e.g., valve ball position 210).

As further shown in FIG. 2A, the valve body 102 includes a saddle recess 212, for instance integrally cast with the valve body 102, and defined by the integrally formed bellow 105. The saddle recess 212 is shaped to receive at least a portion of the saddle 208 therein during the normal operation mode of the valve. The saddle recess 212 positions the saddle 208 and an associated portion of the stem 206 out of the fluid flow passage 108, and thereby allows for continuous uninterrupted flow of fluid during the normal operation mode. Further, by positioning the saddle recess 212 out of the fluid flow passage 108, accumulation of solids, sludge or stringy materials along the saddle 208 and interference with the operation of the ball member 200 (e.g., with the ball seat 202) is substantially avoided.

Figure 2B:
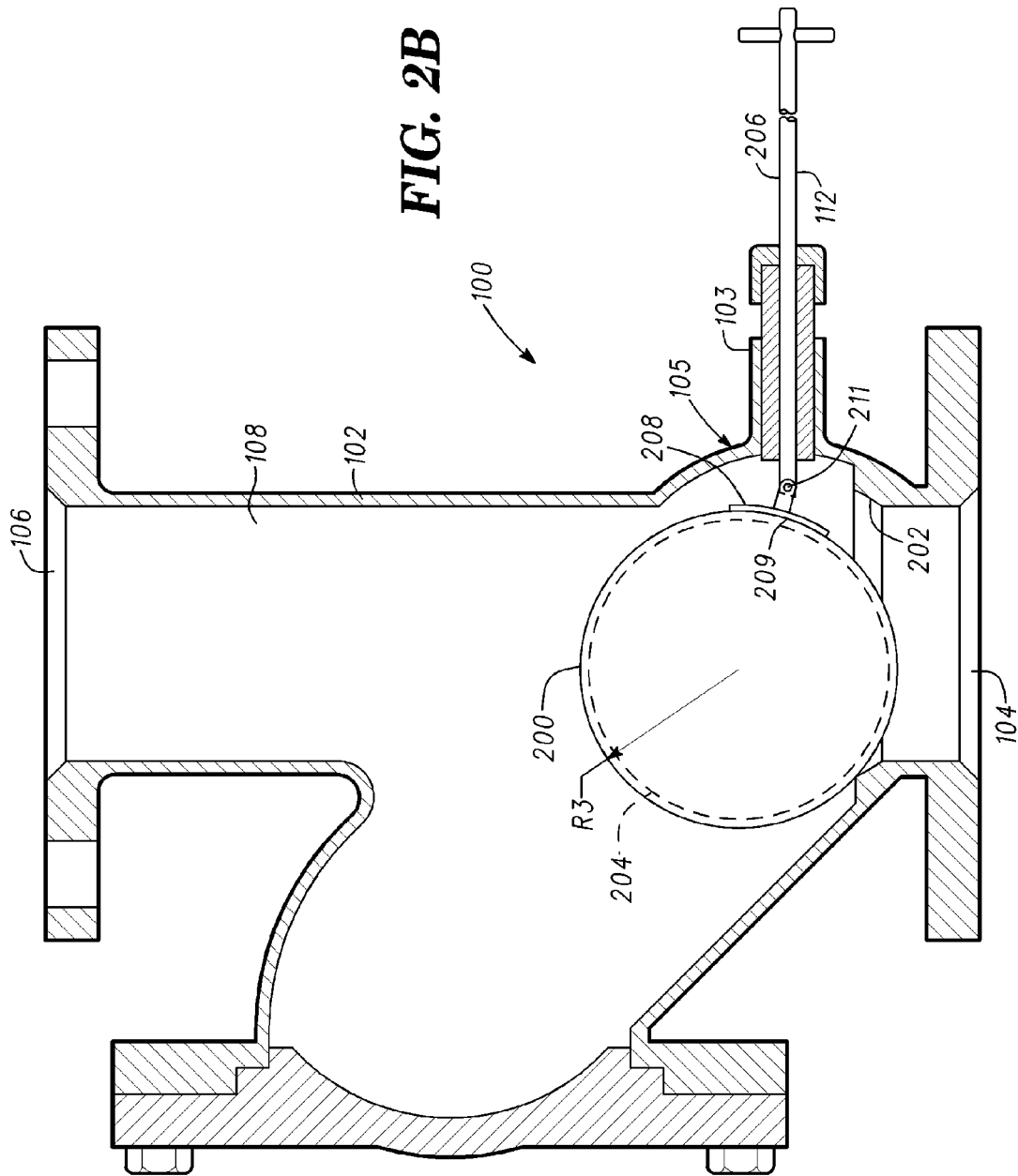
FIG. 2B is a cross sectional view of the ball check valve of FIG. 2A with the valve ball in an intermediate mode between the normal operation and backflow capable modes.

Referring now to 2B, the valve ball 200 is shown in an intermediate mode, wherein the stem and saddle assembly 112 is moved inwardly relative to the valve body 102 and away relative to the integrally formed bellow 105. As shown, the saddle 208 is positioned inwardly relative to the fluid flow passage 108. The concave or curved shape of the saddle inner surface 209 allows for a distributed surface to surface contact with the valve ball 200, such that acute, localized or point contact is minimized. As shown in FIG. 2B, the valve ball 200 is biased by the stem and saddle assembly 112, for instance the saddle inner surface 209, into the intermediate mode shown herein. The valve ball 200 is no longer directly seated within the ball seat 202 thereby allowing for at least some back flushing of fluid through the fluid flow 108, for instance from the valve outlet 104. Stated another way, the saddle 208 (e.g., the saddle inner surface 209) cups at least a portion of the valve ball 200 to gradually lift and move the valve ball 200 out of the ball seat 202 (e.g., out of concave reception of the valve ball 200).

Figure 2C:
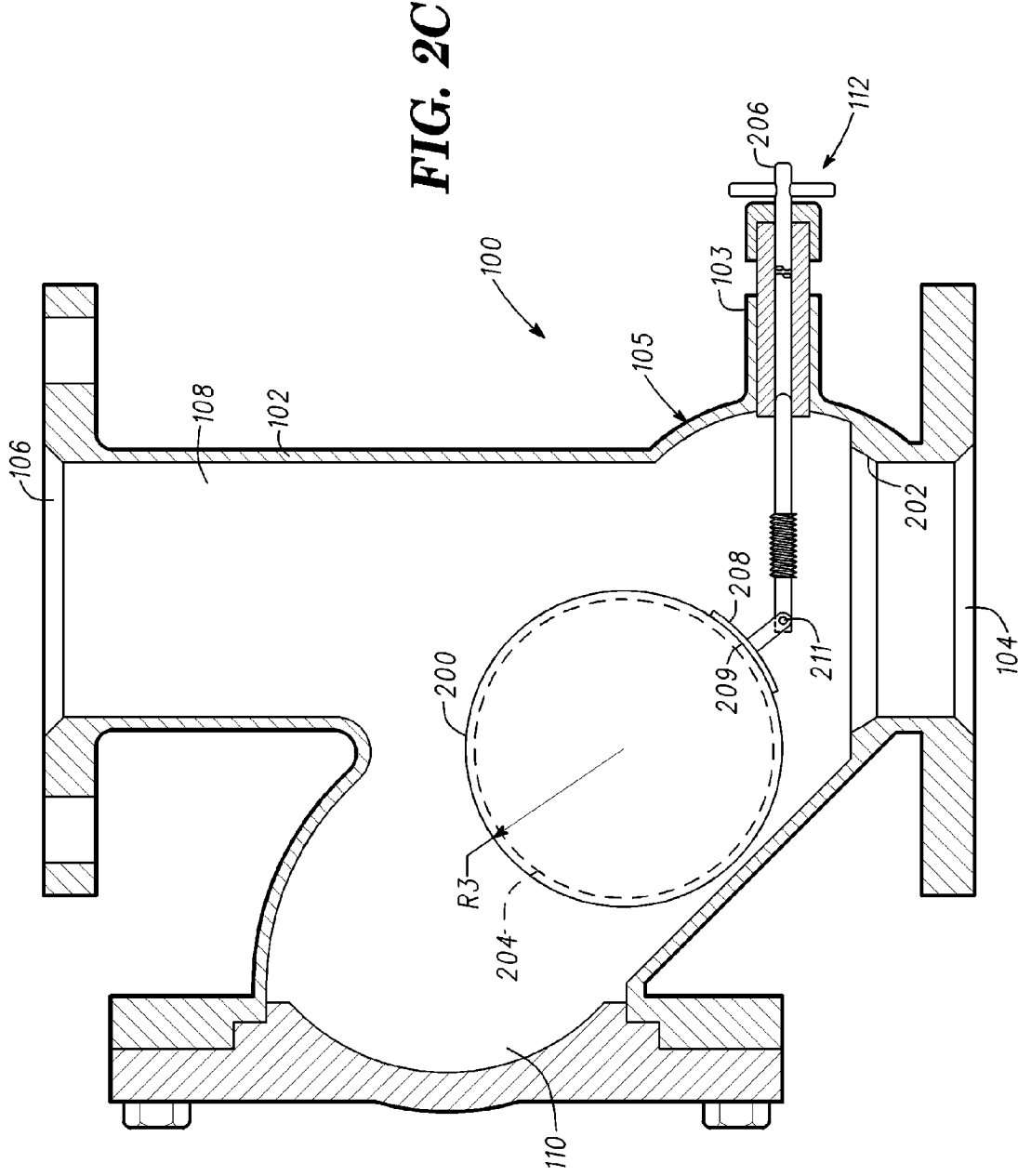
FIG. 2C is a cross sectional view of the ball check valve of FIG. 2A with the valve ball in a backflow capable mode.

Referring now to FIG. 2C, the backflow capable ball check valve 100 is shown with the valve ball 200 in a backflow capable mode. In this mode, the stem and saddle assembly 112 is shown substantially or fully positioned within the fluid flow passage 108. As shown, the saddle 208 has biased the valve ball 200 into the sidetrack 110 to thereby provide a substantially unobstructed path through the valve body 102, for instance, along the linear and continuous fluid flow passage 108. The saddle 208 is shown pivoted relative to the previous orientations (FIGS. 2A and 2B), and maintains surface to surface contact with the valve ball 200. The movable joint 211 allows the saddle 208 to self-adjust according to the movement of the valve ball 200 through engagement and movement of the stem 206.

As previously described above, in one example, the valve ball 200 includes a pliable (e.g., resilient) coating 204 there around. Damage to the pliable coating 204 permits less than ideal sealing performance, for instance, decreased concave reception and sealing of the valve ball 200 within the ball seat 202 or surface to surface contact with the saddle inner surface 209. The pliable coating 204 is subject to damage, for instance, by point contact provided by a blunt pushing member, such as a rod or a device with a low surface to surface contact area with the valve ball 200. The self-adjusting saddle 208 mounted with the movable joint 211 of the stem and saddle assembly 112 is able to provide continuous surface to surface contact and concave support with the valve ball 200 to thereby move the valve ball 200 out of the ball seat 202 and gradually into the sidetrack 110 as shown in FIG. 2C. As shown in FIG. 2C, the valve ball 200 is in a cupped position with the saddle 208, pivoted relative to the stem 206 through operation of the movable joint 211.

Figure 3:
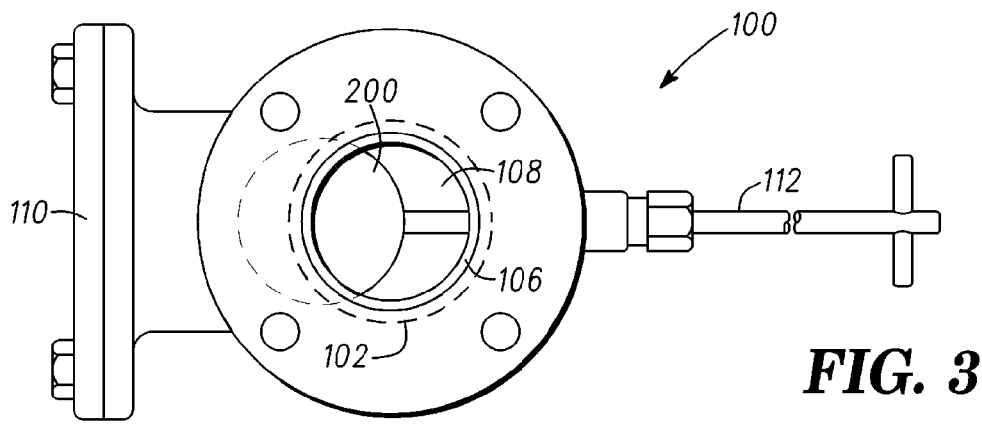
FIG. 3 is an end view of the ball check valve of FIG. 2B with the valve ball in the backflow capable mode.

FIG. 3 shows an end view of the backflow capable ball check valve 100 previously shown in the figures herein. In this example, the backflow capable mode shown in FIG. 2C is provided again. As shown, the valve ball 200 is received at least partially within the sidetrack 110 to thereby allow substantially unobstructed flow of fluid through the fluid flow passage 108. In the example shown in FIG. 3 the valve ball 200 is coincident with only a portion of the fluid flow passage 108, for instance the valve ball is coincident with one half or less of the fluid flow passage 108. Fluid in an upstream discharge pipe assembly coupled with the backflow capable check valve 100 is thereby able to easily move through the valve body 102 to provide back flushing capability for the valve 100 and draining of the discharge pipe assembly.

Figure 4:
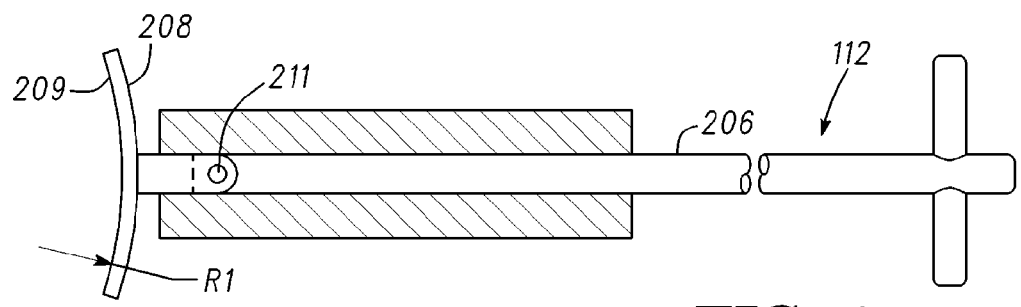
FIG. 4 is a detailed cross sectional view of one example of a stem and saddle assembly.
Figure 5:
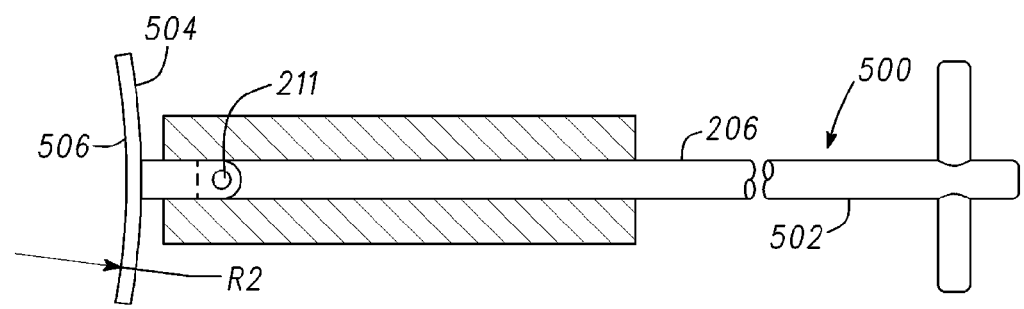
FIG. 5 is a detailed cross sectional view of another example of a stem and saddle assembly.

Referring now to FIGS. 4 and 5, the stem and saddle assembly 112 and a second stem and saddle assembly 500 are shown respectively. As shown in FIGS. 4 and 5, each of the stem and saddle assemblies 112, 500 include a movable joint 211 that allows for pivoting movement of the saddles 208, 504 relative to the respective stems. The movable joints 211 allow for pivoting self-adjustment of the saddles 208, 504 to maintain supporting surface to surface contact (e.g., concave reception of the valve ball 200) as the valve 100 are moved into the backflow capable mode.

In the example shown in FIG. 4, the stem and saddle assembly 112 includes a stem 206 and a pivotally mounted saddle 208 having the saddle inner surface 209 previously described herein. In one example, the saddle inner surface 209 has a first radius such as R1 that is less than the radius R2 of the stem and saddle assembly 500 shown in FIG. 5. For instance, with the example shown in FIG. 5, the saddle 504 has a saddle inner surface 506 corresponding to the larger radius R2. The radii R1 and R2 correspond to the curvature of the inner surfaces 209 and 506, respectively. That is, the radii R1, R2 are the radii of a circle that can be drawn from the curvature of the inner surfaces 209, 506. In the example shown in FIG. 5, for instance, the stem and saddle assembly 500 is able to cooperatively engage in surface to surface contact with larger valve balls such as valve balls of up to about 24 inches in diameter and weighing up to 400 pounds or more to thereby provide surface to surface contact and support and the gradual movement of the valve ball without damaging the pliable coating surrounding the valve ball.

As shown in FIGS. 4 and 5, the stem and saddle assemblies 112 and 500 are configured to move by at least one or more mechanisms including, but not limited to, electrics, pneumatics, hydraulics, manual actuation or a mechanism. For instance, as shown, the stems 206 and 502 are substantially smooth such that the stem can move freely inwardly, within the stem and saddle assemble housing 103, relative to the fluid passage when a lateral force is applied to the stem. Alternatively, the stem and saddle assemblies 112 and 500 are threadably coupled with the valve body, wherein rotation of the stem and saddle assembly relative to one or more threads of the valve body is configured drive the saddle 208, 504 inwardly relative to the fluid passage.

Figure 6:
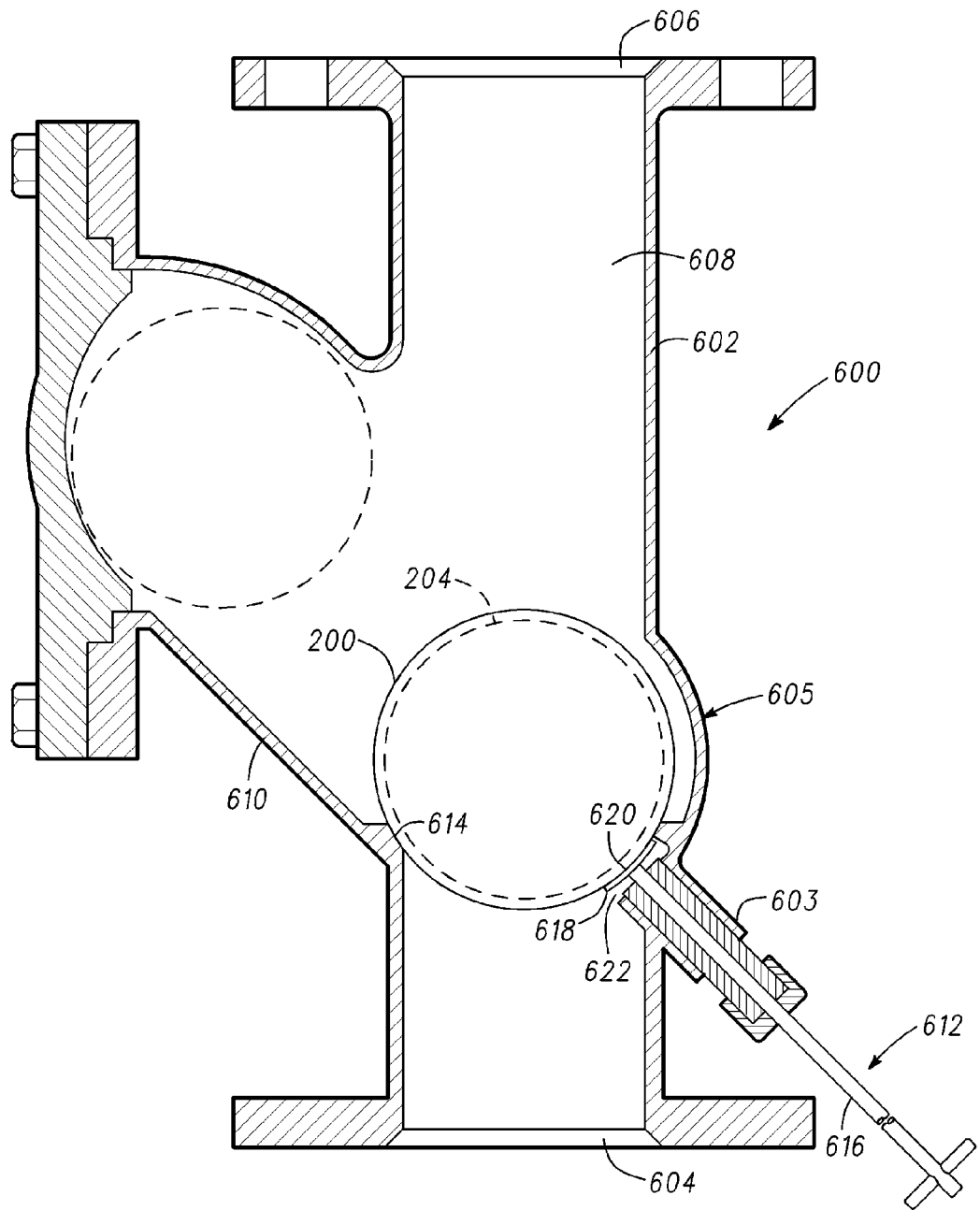
FIG. 6 is a cross-sectional view of one example of a backflow capable ball check valve.

Referring now to FIG. 6, another example of a backflow capable ball check valve 600 is provided. As shown, the backflow capable ball check valve 600 includes at least some similar features to the backflow capable ball check valve 100 previously described herein. For instance, the backflow capable ball check valve 600 includes a valve body 602 having a corresponding valve inlet 604 and a valve outlet 606. As further shown in FIG. 6, a continuous linear fluid passage 608 extends through the valve body 602. As described herein, the valve ball 200, the ball seat 614 and the like are positioned outside of or around the continuous linear fluid passage 608 in a fashion to avoid interruptions, restrictions or discontinuities in the flow of fluid through the valve body 602. Stated another way, the continuous linear fluid passage 608 provides a continuous passage through the valve body 602 without any breaks, such as a 45 degree seat or a discontinuity to allow for the ball side track or the like to interfere with the flow of fluid.

As further shown in FIG. 6, a ball sidetrack 610 is sized and shaped and provided within the ball valve body 602 for reception of the valve ball 200, for instance during a normal operation mode or a back flushing or drainage operation in the backflow capable mode.

As further shown in FIG. 6, and in a similar manner to the previously described backflow capable ball check valve 200, the backflow capable ball check valve 600 further includes a stem and saddle assembly 612 having a stem 616 and a saddle 618 partially housed in stem and saddle assembly shell 603 defined by a bellow 605 is integrally formed with the valve body 602. As shown, the saddle 618 has a cupped surface sized and shaped to provide surface to surface contact along a saddle inner surface 620 with the valve ball 200. Operation of the stem 616, for instance, by rotation of the stem relative to threads in the valve body 602 drives the stem 616 and the saddle 618 into engagement with the ball member 200. The valve ball 200 is thereby lifted out of the ball seat 614 and driven linearly into the ball sidetrack 610 shown in FIG. 6. The saddle inner surface 620 has a corresponding shape to the valve ball 200 and thereby provides consistent and reliable surface to surface contact between the saddle inner surface 620 and the valve ball 200. Pliable coatings, such as 204 in FIG. 2A, applied to the valve ball 200, for instance, for affirmative seating and sealing with the ball seat 614, are thereby protected by the operation of the stem and saddle assembly 612 to ensure a long operation lifetime for the backflow capable ball check valve 600.

The backflow capable ball check valve 600 further includes a saddle recess 622 as shown in FIG. 6. In one example, the saddle recess 622 positions at least a portion of the saddle 618, as well as a portion of the stem 616, fully recessed of the continuous linear fluid passage 608 of the valve body 602. Recessing of the stem and saddle assembly 612 substantially prevents the accumulation of matter, such as debris, including stringy materials, sludge and the like, along the stem and saddle assembly 612 during normal operation of the backflow capable ball check valve 600. For instance, the saddle recess 622 allows for the positioning of the saddle 618 substantially out of the continuous linear fluid passage 608 thereby allowing stringy materials, sludges, particulate and solid matter to flow by the stem and saddle assembly 612 without engaging, interacting and coming to rest along the saddle 618. The continuous linear fluid passage 608 is thereby able to remain in an open configuration throughout the operation lifetime of the backflow capable ball check valve 600. Further, because the stem and saddle assembly 612 is recessed within the saddle recess 622 the ball seat 614 is also kept clear of any materials, for instance, stringy or particulate materials that would otherwise accumulate with a projecting stem and saddle assembly 612. The ball member 200 is thereby able to consistently and reliably seat within the ball seat 614 and provide sealing or shutoff modes for the backflow capable ball check valve 600 during normal operation without leakage.

In contrast to the previously shown backflow capable ball check valve 100, the backflow capable ball check valve 600 provides the stem and saddle assembly 612 on an axis substantially parallel to a movement axis of the ball during normal operation of the ball, for instance, according to hydrodynamic and pressurized flow of water from the valve inlet 604 to the valve outlet 606. Additionally, the stem and saddle assembly is provided along an axis parallel and coincident with a longitudinal axis of the ball side track 610. The stem and saddle assembly 612 is thereby able to move the ball into the ball side track 610 without any pivoting required between the stem and saddle assembly 612. Stated another way, the stem 616 is able to drive, by way of the saddle 618, the ball member 200 into the ball side track 610. The saddle 618 including the saddle outer surface 620 is able to maintain surface to surface contact between the ball 200 and the saddle 618 throughout the movement of the ball into the ball side track 610. Additionally, as shown in FIG. 6, the stem and saddle assembly 612 is able to move the ball substantially the entire length of the ball side track 610, for instance, by rotation of the stem 616. The ball member 200 is thereby able to move into the orientation shown by phantom lines in FIG. 6 to completely open the continuous linear fluid passage 608 in a backflow mode where drainage or back flushing of the backflow capable ball check valve 600 as well as any sort of discharge piping upstream from the valve 600 is desired.

Optionally, the valves 100, 600 are sized and shaped for applications associated with differing pipeline sizes. For instance, the backflow capable ball check valve 600 is sized for pipeline applications of 2 to 8 inches and includes a ball member 200 having a weight of around 50 pounds or less. In another example, the backflow capable ball check valve 100 is sized for pipeline applications of 10 to 24 inches with a ball member 200 weight 60 pounds or more.

The present description provides the benefit of increasing capability of current ball valves, such as by providing an external device means to move a valve ball from a closed to an open position. The external device, such as a stem and saddle assembly, can be adapted to full flow ball check valves, such as in municipal, industrial, and commercial pumping applications to 'check' the flow and prevent liquid from backward movement once pumped flow subsides or the pump shuts-off. Two current exemplary check valves include a 90° swing check valve and a 45° flexible disc check valve. Both of these types of check valves have typically been more popular and more commonly used because of their ability to raise the check valve disc to allow backflow and backflush of pumps, as well as to drain a vertical column of liquid located upstream of the check valve.

The present disclosure incorporates a saddle which is contoured to fit and support various sized valve balls. Benefits of the present disclosure include a ball valve with a stem and support saddle configured to move the ball upwards from its seated position to permit backflow, backflush, and pipeline drainage of more popular check valves to at least equal in performance of more popular check valves. Upon completion of a backflush and pipeline drainage operation the stem and saddle can be returned to their normal position, nestled into the valve body, out of the liquid flow path through the ball check valve. The present disclosure can provide full support of the valve ball and alleviate the potential of having a blunt stem push or penetrate and damage the exterior coating of the valve ball.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A backflow capable ball check valve comprising:
a valve body including a fluid flow passage and a ball seat within the fluid flow passage;
a valve ball within the fluid flow passage, the valve ball configured for seating on the ball seat, and the valve ball is movable between a normal operation mode and a backflow capable mode;
a stem and saddle assembly coupled with the valve body, the stem and saddle assembly including a movable joint pivotally coupling the saddle with the stem, the stem and saddle assembly configured to contact the valve ball, and movement of the stem and saddle assembly moves the valve ball; and
in the normal operation mode the valve ball is seated along the ball seat, and
in the backflow capable mode the stem and saddle assembly positions the valve ball away from the ball seat with the saddle contacting the valve ball.

2. The backflow capable ball check valve of claim 1, wherein the valve body includes a sidetrack, and wherein the backflow capable mode the valve ball is positioned at least partially within the sidetrack.

3. The backflow capable ball check valve of claim 1, wherein the fluid flow passage is continuously linear through the valve body.

4. The backflow capable ball check valve of claim 1, wherein the saddle has a corresponding shape to the valve ball.

5. The backflow capable ball check valve of claim 1, wherein the saddle is in surface to surface contact with the valve ball from between the normal operation mode to the backflow capable mode.

6. The backflow capable ball check valve of claim 1, wherein the valve ball includes a pliable coating.

7. The backflow capable ball check valve of claim 1, wherein the movable joint is configured to maintain surface to surface contact between the saddle and the valve ball from between the normal operation mode to the backflow capable mode.

8. The backflow capable ball check valve of claim 1, wherein the movable joint is configured to be self-adjusting according to movement of the valve ball through engagement and movement of the stem.

9. The backflow capable ball check valve of claim 1, wherein the valve body includes a sidetrack, and a longitudinal axis of the stem and saddle assembly is parallel to a longitudinal axis of the sidetrack.

10. The backflow capable ball check valve of claim 9, wherein the longitudinal axis of the stem and saddle assembly is coincident to the longitudinal axis of the sidetrack.

11. The backflow capable ball check valve of claim 9, wherein the stem and saddle assembly and the sidetrack are each at an angle of around 45 degrees relative to a longitudinal axis of the fluid flow passage.

12. The backflow capable ball check valve of claim 1, wherein the valve body includes a saddle recess sized and shaped to receive the saddle therein during the normal operation mode, and the saddle is outside a perimeter of the fluid flow passage in the normal operation mode.

13. The backflow capable ball check valve of claim 1, wherein an inner surface of the saddle includes a corresponding radius to a radius of the valve ball.

14. The backflow capable ball check valve of claim 1, wherein the stem and saddle assembly is configured to cup the valve ball.

15. A backflow capable ball check valve comprising:
 a valve body including a fluid flow passage, a saddle recess, and a ball seat adjacent to the fluid flow passage, the ball seat is coincident with outside of a perimeter of the fluid flow passage;
 a valve ball within the fluid flow passage, the valve ball configured for seating in the ball seat, and the valve ball is movable between a normal operation mode and a backflow capable mode;
 a stem and saddle assembly coupled with the valve body, the stem and saddle assembly including a movable joint pivotally coupling the saddle with the stem, the stem and saddle assembly configured to engage and move the valve ball; and
 in the normal operation mode the valve ball is seated in the ball seat free of contact with an inner surface of the saddle, the saddle and the stem are recessed within the saddle recess free of the fluid flow passage of the valve body, and
 in the backflow capable mode the stem moves the valve ball away from the recess and out of the fluid flow passage.

16. The backflow capable ball check valve of claim 15, wherein the valve body includes a sidetrack, and wherein the backflow capable mode the valve ball is positioned at least partially within the sidetrack.

17. The backflow capable ball check valve of claim 15, wherein the stem assembly is threadably coupled with the valve body, wherein rotation of the stem assembly relative to one or more threads of the valve body is configured to drive the stem into engagement with the valve ball.

18. The backflow capable ball check valve of claim 15, wherein the stem assembly is configured to move by at least one of pneumatically, hydraulically, manually, and mechanically.

19. A backflow capable ball check valve comprising:
 a valve body including a fluid flow passage, a saddle recess, and a ball seat adjacent to the fluid flow passage, the ball seat is coincident with outside of a perimeter of the fluid flow passage;
 a valve ball within the fluid flow passage, the valve ball configured for seating on the ball seat, and the valve ball is movable between a normal operation mode and a backflow capable mode;
 a stem and saddle assembly coupled with the valve body, the stem and saddle assembly including a movable joint pivotally coupling the saddle with the stem, the stem and saddle assembly configured to contact the valve ball, wherein a shape of the saddle corresponds to a shape of the valve ball, and movement of the stem and saddle assembly moves the valve ball;
 in the normal operation mode the valve ball is seated along the ball seat free of contact with an inner surface of the saddle, the saddle and the stem are recessed within the saddle recess free of the fluid flow passage of the valve body, and
 in the backflow capable mode the stem and saddle assembly positions the valve ball away from the ball seat with the saddle contacting the valve ball, wherein the saddle is in surface to surface contact with the valve ball from between the normal operation mode to the backflow capable mode, and
 a sidetrack in fluid communication with the valve body, wherein the backflow capable mode the valve ball is positioned at least partially within the sidetrack.

20. The backflow capable ball check valve of claim 19, wherein the stem and saddle assembly is upstream of the ball seat and located along an axis coincident with a longitudinal axis of the sidetrack.

* * * * *